June 12, 1934. W. A. THOMAS 1,962,537
SHARPENING DEVICE FOR LAWN MOWERS
Filed Aug. 11, 1932  2 Sheets-Sheet 1

INVENTOR
Wilfred A. Thomas
BY
Chappell & Earl
ATTORNEYS.

June 12, 1934.   W. A. THOMAS   1,962,537
SHARPENING DEVICE FOR LAWN MOWERS
Filed Aug. 11, 1932   2 Sheets-Sheet 2
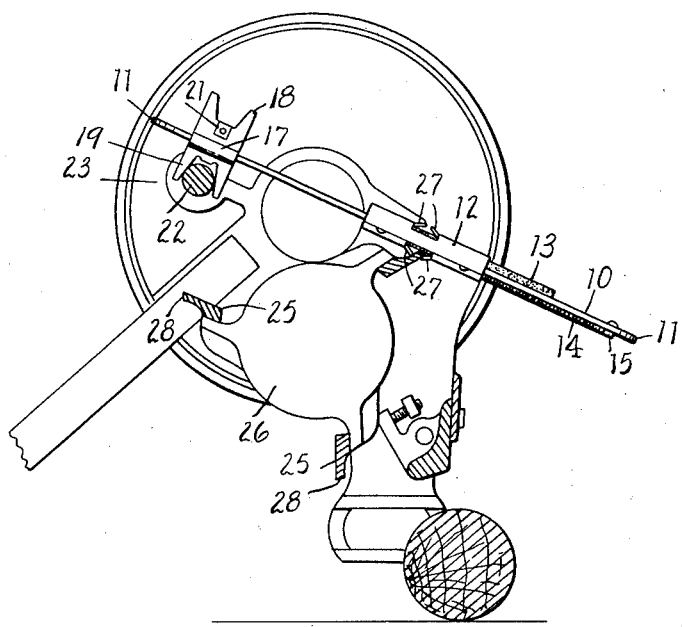
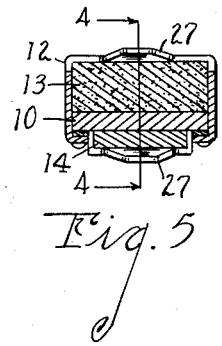
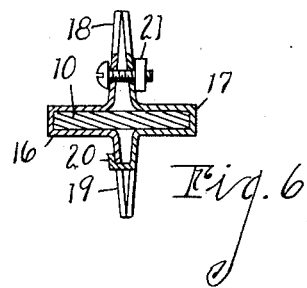
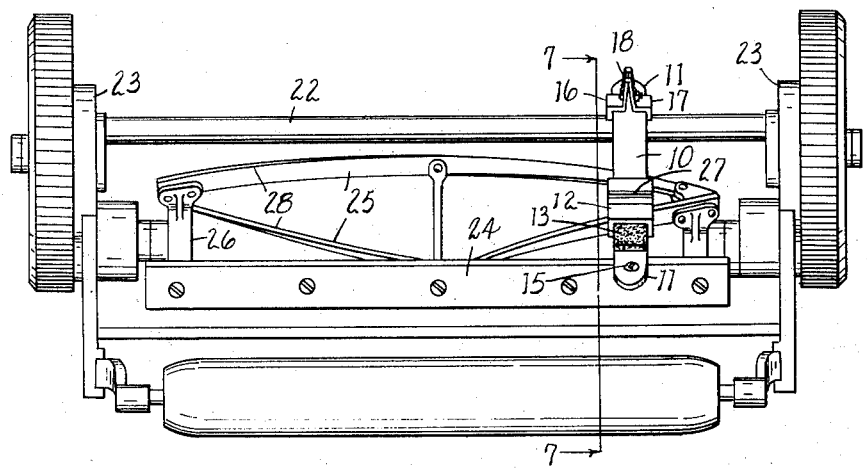
INVENTOR
Wilfred A. Thomas
BY Chappell & Earl
ATTORNEYS.

Patented June 12, 1934

1,962,537

UNITED STATES PATENT OFFICE 1,962,537

SHARPENING DEVICE FOR LAWN MOWERS

Wilfred A. Thomas, Sturgis, Mich.

Application August 11, 1932, Serial No. 628,430

4 Claims. (Cl. 76—82.1)

The primary object of the invention is the provision of a sharpener of this character of simple design by which the blades on the cutting reel of a lawn mower can be readily and conveniently sharpened without the removal of these blades from the mower, this operation involving draw filing and honing or grinding.

Another object of the invention is the provision of a sharpener of this character, wherein on the application thereof to the mower the movable blade reel on full stroke of the sharpener automatically feeds the beveled or cutting edge into proper position and at a uniform angle, whereby on stroking the sharpener will act upon the beveled or cutting edge of the blade for a smooth and keen cutting surface thereto, which is extremely simple in construction, thoroughly reliable and efficient in its purpose, strong, durable, and inexpensive to manufacture, and in which a section of file or stone is effectively, adjustably and automatically advanced and maintained in working position utilizing the acting surfaces quite fully.

The invention is illustrated in the accompanying drawings in which:

Fig. 5 is an enlarged transverse sectional view taken on the line 5—5 of Fig. 2.

Fig. 6 is an enlarged sectional view on the line 6—6 of Fig. 2.

Fig. 7 is a fragmentary vertical transverse sectional view through a lawn mower showing the sharpener applied thereto in position for the sharpening of one of the blades of the mower in place on the cutting reel taken on line 7—7 of Fig. 8.

Fig. 8 is an elevation of a lawn mower with my improved sharpener in operating position from the right hand side of Fig. 7.

The parts will be identified by their numerals of reference which are the same in all the views.

Figure 1:
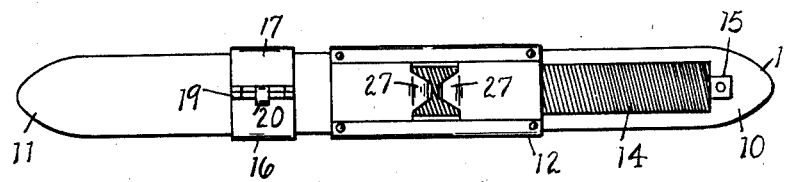
Fig. 1 is a plan view of the sharpener constructed in accordance with my invention.
Figure 2:
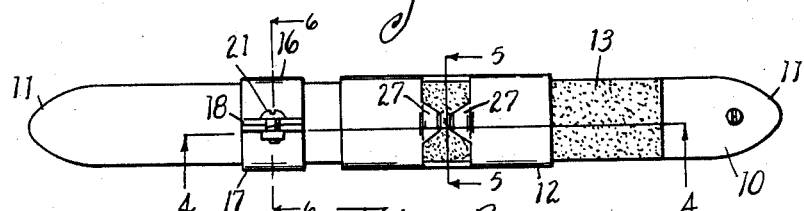
Fig. 2 is a similar view looking toward the opposite side of the sharpener.
Figure 3:
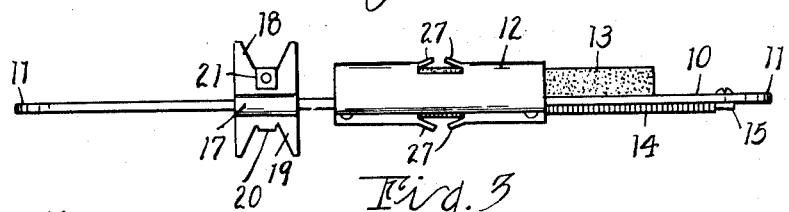
Fig. 3 is a side elevation thereof.
Figure 4:
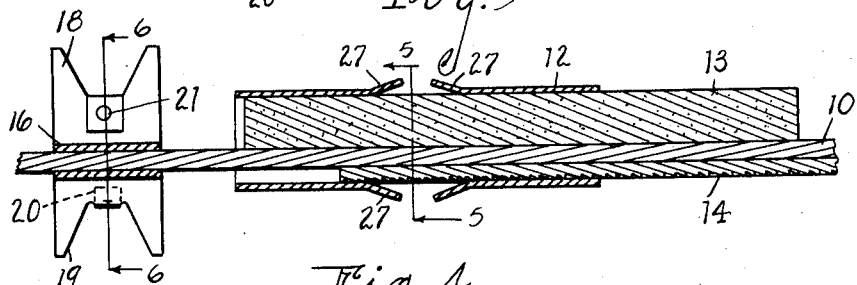
Fig. 4 is a fragmentary enlarged longitudinal central sectional view on the line 4—4 of Fig. 2.

The sharpener comprises a flat bar 10 having the outwardly tapered opposite ends 11 serving as handles. 12 is a housing in the form of a sleeve projecting to each side to form open ended housings. 13 is a sharpening slab of carborundum. 14 is a section of sharpening file disposed in said housings at opposite sides of the bar 10 and directed longitudinally thereof. The file 14 and the sharpening stone are detachably retained on the bar through the medium of a stop 15 which is a cross bolt, the head being the stop for the stone and the nut being the stop for the file, or vice versa. (See Fig. 3.) The stone or file, either one is free to move in the support.

The bar 10 has fitted thereon a sliding stop in the form of a split two-part clip. The parts 16 and 17 are formed with registering ears constituting matched forks 18 and 19, respectively, disposed above and below the bar. The part 17 is formed with a hook 20 engaging and clinching the part 16 at the crotch of the fork 18 formed thereon. The fork 19 has ears from which the said fork is formed joined by an adjusting screw bolt 21. Thus the sleeve including the parts 16 and 17 can be adjusted longitudinally of the bar and the bar is reversible. Either the fork 18 or 19 is adapted to straddle the brace rod 22 joined with the sides 23 of the frame of the lawn mower as is clearly shown in Figs. 7 and 8 of the drawings so that the sharpener will assume a correct position for the sharpening of the movable spiral blades 25 carried on reel 26 of the lawn mower whichever side is up, the file or the stone. The sharpener is shown in Fig. 7 in a position for the sharpening of the movable blades 25 on the reel 26.

The housing 12 embracing the stone 13 and file 14 at opposite sides thereof has cut and stamped therefrom outwardly directed opposed angular jaws 27. These jaws are spaced the required distance apart to engage with each of the movable spiral blades 25 so that on reciprocation of the sharpener these spiral blades, by reason of their curvilinear formation, will automatically present the beveled cutting edge 28 of the blades 25 to the sharpener at a uniform and proper angle. The sharpener is stroked with moderate pressure lengthwise of the reel so that the said blades will be quickly sharpened with a smooth, keen edge having the proper bevel. The filing is done by draw filing. The grinding or filing elements reciprocate in their supports. The adjustment of the guide sets both file and grinding stone to the correct position. The stationary blade 24 of the lawn mower is merely filed and ground straight using the bar 10 as a convenient handle.

The application of the sharpener with respect to the movable blades 25 will be clearly apparent from Figs. 7 and 8 of the drawings, the sharpener being manually shifted or stroked lengthwise of the cross tie rod in the working thereof. The file or stone shifts readily and automatically in the support to present fresh filing or sharpening surface in correctly gaged position. Where the sharpener is provided for a single size, style and make, adjustability of the guide part is not needed.

Having thus described my invention, what I claim as new and desire to secure by Letters Patent is:

1. In a sharpening device for lawn mowers, the combination of a supporting bar extended into a handle for said sharpener, an open ended housing secured to said bar having a cross aperture to provide a guide adapted to receive and guide the spiral blade of a lawn mower, a sharpening element comprising a section of file disposed within said housing and slidably adjustable in relation to said bar and adapted to act by draw filing upon the said guided spiral blade, a forked guide member adjustably clamped to the said main supporting bar and adapted to slidably engage a cross rod on the said lawn mower, whereby on reciprocation of the said sharpener along said rod the reel of the lawn mower will be oscillated and the spiral blade guided to correct position for sharpening, the said section of file being automatically movable in said housing to change the relation of the cutting surface of said file to said blade.

2. In a sharpening device for lawn mowers, the combination of a supporting bar extended into a handle for said sharpener, an open ended housing secured to said bar having a cross aperture to provide a guide adapted to receive and guide the spiral blade of a lawn mower, a sharpening element comprising a section of stone disposed within said housing and slidably adjustable in relation to said bar and adapted to act upon the said guided spiral blade, a forked guide member adjustably clamped to the said main supporting bar and adapted to slidably engage a cross rod on the said lawn mower, whereby on reciprocation of the said sharpener along said rod the reel of the lawn mower will be oscillated and the spiral blade guided to correct position for sharpening, the said section of stone being automatically movable in said housing to change the relation of the cutting surface of said stone to said blade.

3. In a sharpening device for lawn mowers, the combination of a supporting bar extended into a handle for said sharpener, an open ended housing secured to said bar having a cross aperture to provide a guide adapted to receive and guide the spiral blade of a lawn mower, a sharpening element disposed within said housing and slidably adjustable in relation to said bar and adapted to act upon the said guided spiral blade, a forked guide member adjustably clamped to the said main supporting bar and adapted to slidably engage a cross rod on the said lawn mower, whereby on reciprocation of the said sharpener along said rod the reel of the lawn mower will be oscillated and the spiral blade guided to correct position for sharpening, the said sharpening element being automatically movable in said housing to change the relation of the cutting surface of said sharpening element to said blade.

4. In a sharpening device for lawn mowers, a main bar having a handle, a sleeve fixedly secured to said bar to provide open ended housings on opposite sides of the bar, said sleeves being transversely slotted to provide guides for a blade, said housing being adapted to receive sharpening elements of different character to freely and automatically adjust therein, and guides on opposite sides of said bar to embrace a cross rod to control the direction of cross movement.

WILFRED A. THOMAS.